(12) United States Patent
Binder

(10) Patent No.: US 11,507,575 B2
(45) Date of Patent: Nov. 22, 2022

(54) COMPLEX QUERY REWRITING

(71) Applicant: SAP SE, Walldorf (DE)

(72) Inventor: Hans-Martin Binder, Heidelberg (DE)

(73) Assignee: SAP SE, Walldorf (DE)

( * ) Notice: Subject to any disclaimer, the term of this patent is extended or adjusted under 35 U.S.C. 154(b) by 155 days.

(21) Appl. No.: 16/691,209

(22) Filed: Nov. 21, 2019

(65) Prior Publication Data

US 2021/0157814 A1    May 27, 2021

(51) Int. Cl.
*G06F 16/00*    (2019.01)
*G06F 16/2453*    (2019.01)

(52) U.S. Cl.
CPC .. *G06F 16/24535* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 2006/0101011 A1* | 5/2006 | Lindsay | G06F 16/24537 |
| 2007/0219951 A1* | 9/2007 | Ahmed | G06F 16/24544 |
| 2009/0248631 A1* | 10/2009 | Alba | G06F 16/2457 |
| 2015/0149436 A1* | 5/2015 | McKenna | G06F 16/2453 707/714 |
| 2016/0132553 A1* | 5/2016 | Seo | G06F 16/90335 726/28 |
| 2017/0344605 A1* | 11/2017 | Wells | G06F 16/2453 |
| 2017/0346875 A1* | 11/2017 | Wells | G06F 9/5033 |
| 2018/0113901 A1* | 4/2018 | Menzies-Smith | G06F 16/24535 |
| 2020/0059689 A1* | 2/2020 | Lin | H04N 21/4363 |

FOREIGN PATENT DOCUMENTS

| | | | |
|---|---|---|---|
| CN | 103310011 A | * | 9/2013 |
| CN | 106610999 A | * | 5/2017 |
| CN | 110147396 A | * | 8/2019 |

* cited by examiner

*Primary Examiner* — Augustine K. Obisesan
(74) *Attorney, Agent, or Firm* — Mintz Levin Cohn Ferris Glovsky and Popeo, P.C.

(57) ABSTRACT

A method, a system, and a computer program product for rewriting queries. A received query is parsed into a plurality of subqueries, where each subquery has one or more query elements. One or more identical subqueries are identified and grouped into one or more groups. Based on the groups of subqueries, an alias parameter is assigned to each identical subquery. The identical subqueries in the received query are replaced with corresponding aliases. An expression language statement is generated based on the received query, where each identical subquery is replaced with the corresponding assigned alias parameter in the expression language. The generated expression language statement is executed.

20 Claims, 13 Drawing Sheets

FIG. 3a

```
<subquery> [<for_update> | FOR SHARE LOCK | <time_travel>] |
<for_system_time> | [<hint_clause>]
| [<with_clause>] (<subquery>) [<for_update> | <for_xml> | <time_travel>]
[<hint_clause>]

<subquery> ::= <select_clause> <from_clause> [<where_clause>]
[<group_by_clause>]
[<having_clause>]
[<set_operator> <subquery> [(, <set_operator> <subquery>)...]]
[<order_by_clause>]
[<limit>]
```

```
402:
select a from
( select a from
  ( select a from complex_query        ← 406
    union
    select a from complex_query
  )
  except
  ( select b from
    ( select b from complex_query2     ← 408
      union
      select b from complex_query2
    )
  )
)

404:
where a in
( select a from
  ( select a from complex_query        ← 406
    union
    select a from complex_query
  )
  except
  ( select b from
    ( select b from complex_query2     ← 408
      union
      select b from complex_query2
    )
  )
)
```

FIG. 4

```
select a from                           where a in
( select a from complex_query           ( select a from complex_query
  union                                   union
  select a from complex_query )           select a from complex_query )
except                                  except
( select b from complex_query2          ( select b from complex_query2
  union                                   union
  select b from complex_query2 )          select b from complex_query2 )
```

FIG. 5

```
                                402                                                   404
        ┌─────────────────────────────────┐                    ┌─────────────────────────────────┐
   406─►│ select a from ─502              │               406─►│ where a in ─502                 │
        │  ┌──────────────────────────┐◄──┼─602                │  ┌──────────────────────────┐◄──┼─604
        │  │( select a from complex_query│                    │  │( select a from complex_query│
        │  │  union                    │  │                    │  │  union                    │  │
        │  │  select a from complex_query)│                    │  │  select a from complex_query)│
        │  └──────────────────────────┘   │                    │  └──────────────────────────┘   │
        │ except ─504                     │                    │ except ─504                     │
   408─►│  ┌──────────────────────────┐   │               408─►│  ┌──────────────────────────┐   │
        │  │( select b from complex_query2│                    │  │( select b from complex_query2│
        │  │  union                    │  │                    │  │  union                    │  │
        │  │  select b from complex_query2)                    │  │  select b from complex_query2)
        │  └──────────────────────────┘   │                    │  └──────────────────────────┘   │
        └─────────────────────────────────┘                    └─────────────────────────────────┘
```

```
select a from                          where a in
( select a from        ←406            ( select a from        ←406
    ( select a from complex_query  ←602    ( select a from complex_query  ←602
      union                                  union
      select a from complex_query )          select a from complex_query )
  except                  ←408            except                  ←408
  ( select b from                          ( select b from
    ( select b from complex_query2         ( select b from complex_query2
      union                                  union
      select b from complex_query2 )         select b from complex_query2 )
)                                        )
```

```
WITH
  WSQ1 ( A ) AS (
    SELECT A FROM COMPLEX_QUERY
  ) ,
  WSQ2 ( B ) AS (
    SELECT B FROM COMPLEX_QUERY2
  ) ,
  WSQ3 ( A ) AS (
    SELECT A FROM (
      SELECT A FROM WSQ1
      UNION
      SELECT A FROM WSQ1
      EXCEPT (
        SELECT B FROM WSQ2
        UNION
        SELECT B FROM WSQ2
      )
    )
  )
SELECT A FROM WSQ3
WHERE A IN (
  SELECT A FROM WSQ3
)
```

COMPLEX QUERY REWRITING

TECHNICAL FIELD

This disclosure relates generally to data processing and, in particular, to rewriting of complex query statements, such as, for example, rewriting of complex SQL statements using common table expressions syntax.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Execution of a query typically requires generation of a query plan or query execution plan, which is an ordered set of operations that is used to access stored data (e.g., access data in a SQL relational database management system). Upon submission of a query to the database system, requested data is retrieved based on parameters of the query. Given complexities of modern-day queries and/or their volumes, the underlying database systems face challenges, such as, significant compute resource and memory consumption, total cost of ownership, extended times for execution of complex queries, etc.

SUMMARY

In some implementations, the current subject matter relates to a computer implemented method for rewriting queries. The method may include parsing a received query into a plurality of subqueries, each subquery in the plurality of subqueries having one or more query elements, identifying one or more identical subqueries in the plurality of subqueries and grouping the identified one or more subqueries into one or more groups, assigning, based on the one or more groups of subqueries, an alias parameter to each identical subquery in the plurality of subqueries, replacing one or more identical subqueries in the received query with corresponding aliases, generating an expression language statement based on the received query, wherein each identical subquery is replaced with the corresponding assigned alias parameter in the expression language, and executing the generated expression language statement.

In some implementations, the current subject matter may include one or more of the following optional features. The parsing of the query (e.g., may be performed by a parser) may include generation of a syntactical tree having a plurality nodes. Each node in the plurality of nodes may correspond to a subquery in the plurality of subqueries. Further, the generated expression language statement may be generated using the generated syntactical tree. The syntactical tree may be configured to define a structure of the received query. Moreover, the identified identical subqueries may be grouped into one or more groups using one or more parent nodes in the syntactical tree of nodes including the identical queries. Further, the alias parameters may be configured to be assigned using parent nodes in the syntactical tree.

In some implementations, the generated expression language statement may be a common table expressions (CTE) language statement. The received query may be a structured query language (SQL) statement.

In some implementations, the generated expression language statement may be executed by a database system (e.g., HANA system as developed by SAP SE, Walldorf, Germany) for the purposes of retrieving data queried by the received query.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3a illustrates an exemplary syntax tree;

FIG. 3b illustrates an exemplary syntax that may be used in the generation of the syntax tree shown in FIG. 3a;

FIG. 4 illustrates exemplary elementary subqueries, according to some implementations of the current subject matter;

FIG. 5 illustrates identification and grouping of identical parent subqueries, according to some implementations of the current subject matter;

FIGS. 6-7 illustrates further identification and grouping of identical parent subqueries, according to some implementations of the current subject matter;

FIG. 8 illustrates an exemplary rewritten query, according to some implementations of the current subject matter;

DETAILED DESCRIPTION

Figure 1:
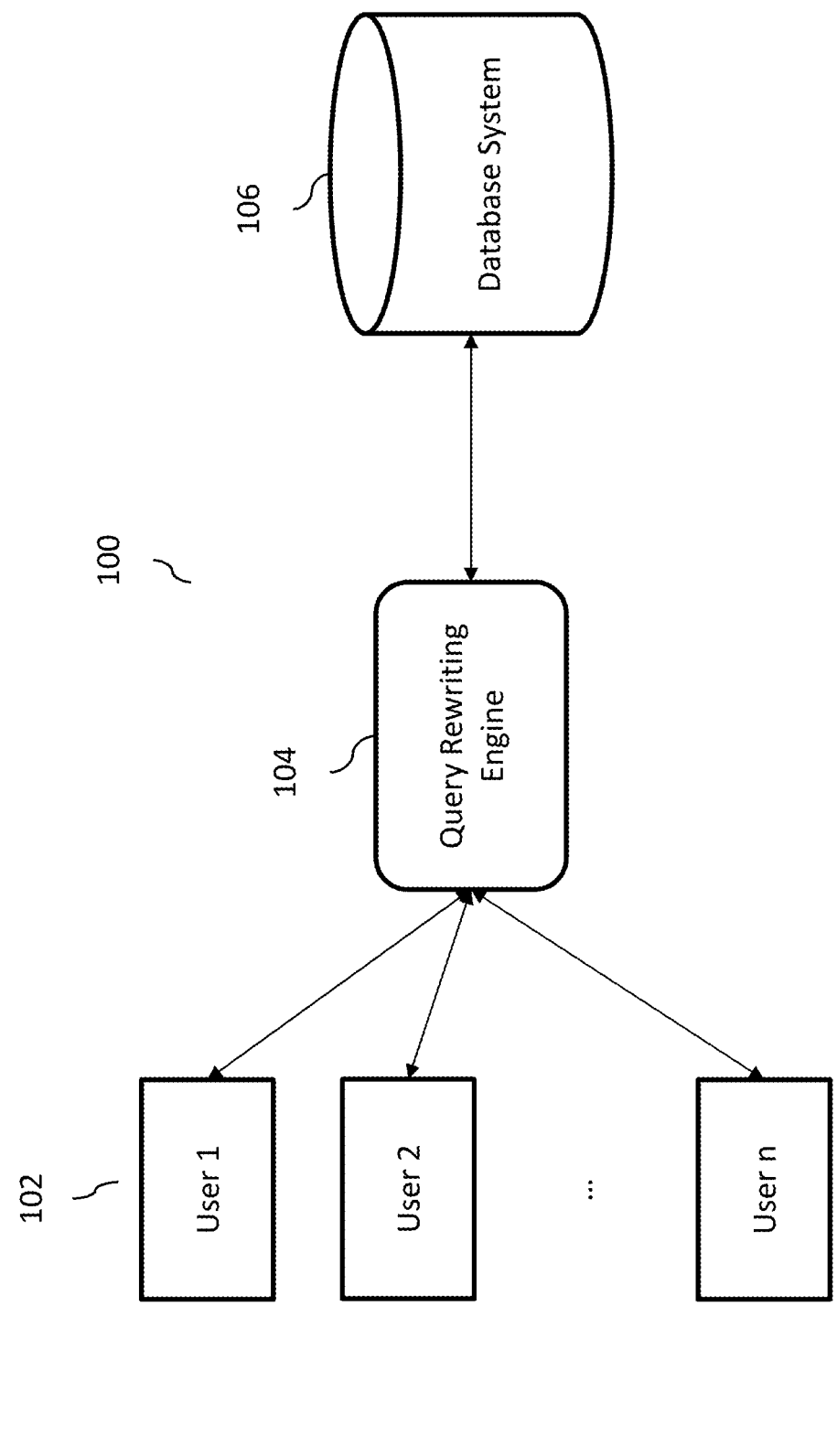
FIG. 1 illustrates an exemplary system for processing of queries, according to some implementations of the current subject matter.

To address these and potentially other deficiencies of currently available solutions, one or more implementations of the current subject matter relate to methods, systems, articles of manufacture, and the like that can, among other possible advantages, provide an ability to rewrite complex query statements to reduce memory consumption and/or improve execution times of such queries, whereby complex queries may be rewritten using common table expressions syntax.

In some implementations, the current subject matter may rewrite complex query statements (e.g., structured query language (SQL) statements) at a syntactic level, which may provide reduced memory consumption, shorter execution times, and lower total cost of ownership. To access various data that may be stored in various database systems, a user may access a user interface, where the user may enter one or more search parameters, keywords, and/or any other information. The entered information may then be converted into SQL statements by a backend system (that may be communicatively coupled to the user interface). The generated SQL statements may be then transmitted to the database systems (e.g., High Performance Analytic Appliance ("HANA") system as developed by SAP SE, Walldorf, Germany) for execution. Since user input may be unrestricted, the models generated by the user in the user interface and, hence, the corresponding SQL statements may become very long and complex. The longer and more complex an SQL statement is, the more processing time and memory may be required in the database to successfully execute the generated SQL statements. Further, it may be difficult for query optimization components (e.g., a database optimizer) of the database system, receiving these statements, to determine and select an optimal query execution plan. This is due to an exponentially rising number of possible execution paths that may result from the complexity of the generated query statements.

On the user side, such large amount of memory and processing time required by complex query statement may lead to long wait times, timeouts, out-of-memory errors, and/or any other problems. Moreover, database system may need to provision large amounts of memory to ensure coverage of memory usage spikes that may be caused by the execution of the complex query statements. This leads to a high total cost of ownership as a lot of memory may need to be constantly provisioned to ensure coverage for occasionally occurring complex query statements.

However, for execution of these statements much less memory may actually be used and/or needed. As such, the current subject matter may be configured to reduce runtime and memory requirements of complex query statements. The reduction of complexity of problematic query statements may be configured to occur at a different level of abstraction than is the user created model, e.g., after the query statement is generated based on a user model. This level may correspond to the abstract syntax representation of a query statement, e.g., the generated query statement may be parsed and transformed into a syntax tree representation where a tree of nodes may represent an actual query string with its different language elements, operators, operands, etc. This tree may then be manipulated to transform the query statement syntactically, while preserving semantic equivalence. The computed result of the syntactically changed query statement may be the same as the original, more complex query statement.

In some exemplary implementations, the original query statement may be transformed and/or simplified at a syntactic level using a common table expressions (CTE) language element(s). In some implementations, the current subject matter may be configured to identify identical subqueries within the main original query statement, based on its syntax tree representation, and group them into groups of identical subqueries. For each subquery in the groups, their parent subquery within the syntax tree may be collected and again grouped into identical subqueries, until no more parent candidate subqueries are found. This way, commencing with the most fine-grained subqueries, larger, and larger identical subqueries may be detected. The identical subqueries of each group may then be transferred into a clause of a rewritten query (e.g., WITH clause according to the CTE syntax) and assigned an alias. In the main body of the rewritten query (e.g., SELECT statement), the identical subqueries may be removed and replaced by the reference to this assigned alias. Thus, this approach may allow for reuse of identical subqueries, which may lead to a reduction in complexity of the original query statement. Further, the actual query statement string may be obtained from the syntax tree, which may then be transmitted to the database system (e.g., HANA) for execution.

FIG. 1 illustrates an exemplary system 100 for processing of queries, according to some implementations of the current subject matter. The system 100 may include one or more users (user 1, user 2, . . . user n) 102, a query rewriting component or engine 104, and a database system 106. The users 102, the query engine 104, and the database system 106 may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Database system 106 may include at least one of the following: databases, storage locations, memory locations, and/or any combination of hardware and/or software components. In some implementations, the database system 106 may be a High Performance Analytic Appliance ("HANA") system as developed by SAP SE, Walldorf, Germany, as will be described below.

The engine 104 may include any combination of software and/or hardware components and may be configured to receive an original query from one or more users 102 to obtain data from the database system 106. The query may be already converted into a query language statements, e.g., SQL statements. The engine 104 may then be configured to execute rewriting of the SQL query using common table expressions syntax to generate a rewritten query that may then be transmitted to the database system 106 for execution, as shown in FIG. 2.

Figure 2:
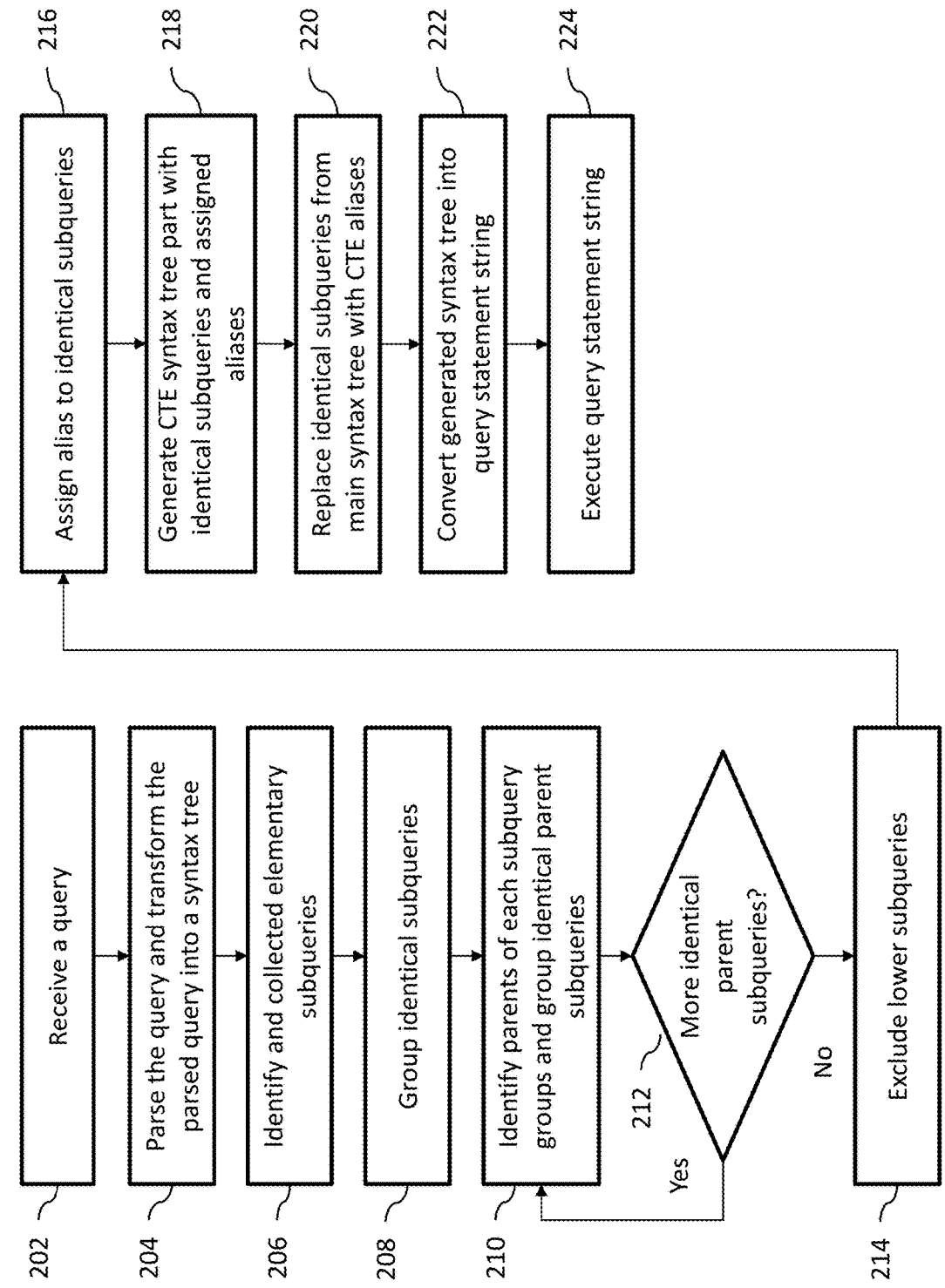
FIG. 2 illustrates an exemplary process for rewriting a query, according to some implementations of the current subject matter.

FIG. 2 illustrates an exemplary process 200 for rewriting a query, according to some implementations of the current subject matter. At 202, a query may be received. The query may be generated by the user 102 (as shown in FIG. 1) and may be transformed into query language expressions (e.g., SQL statements). The query may include various parameters that may identify the data being sought and stored in the database system 106.

Figure 3A:
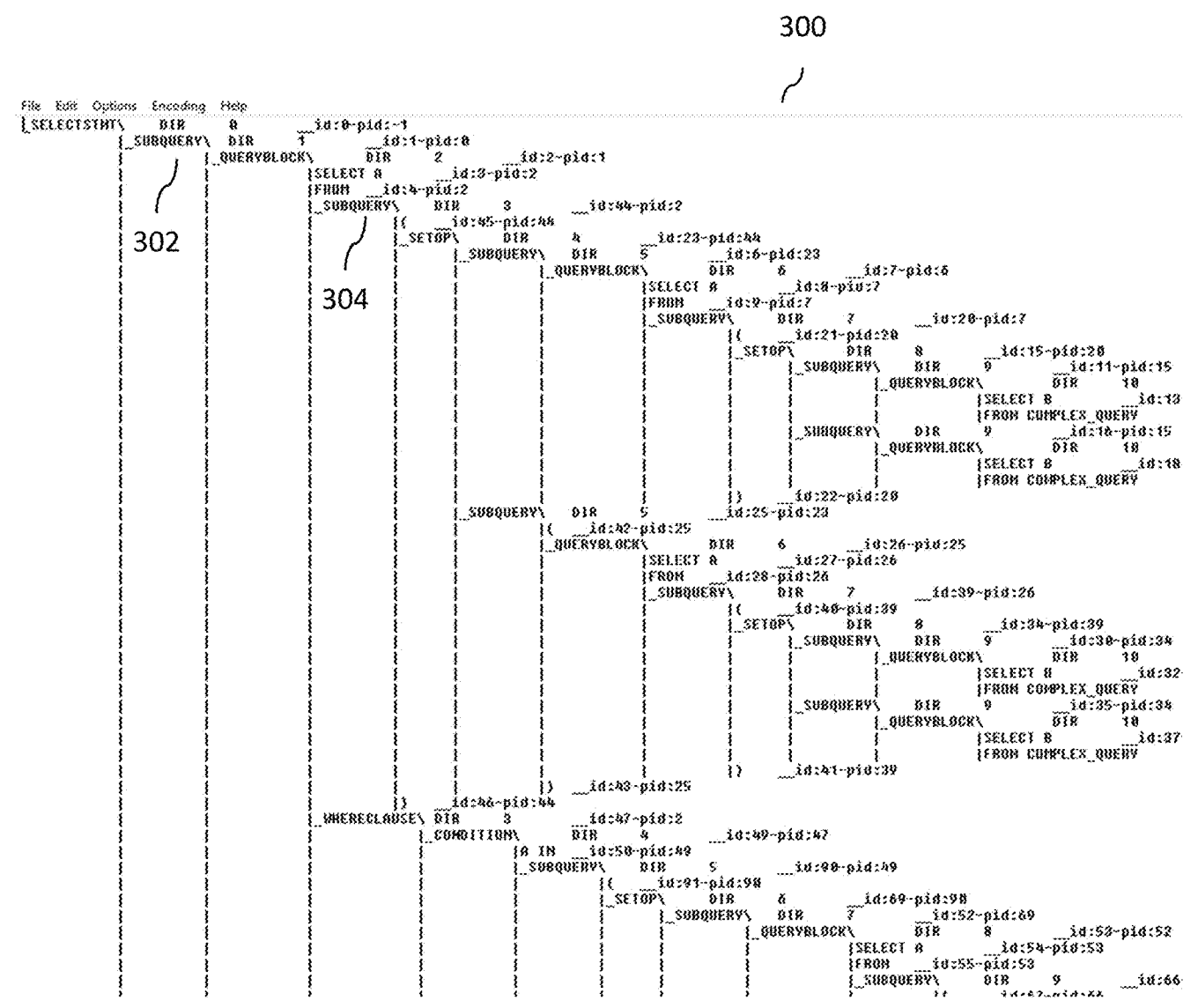

At 204, the engine 104 may be configured to parse the received query statements and generate a syntax tree. An exemplary syntax tree 300 is illustrated in FIG. 3a. The syntax tree may include one or more nodes, where each node may include a subquery (e.g., subquery 302, as shown in FIG. 3*a*). FIG. 3*b* illustrates an exemplary syntax 310 that may be used in the generation of the syntax tree 300 shown in FIG. 3*a*. Each subquery node may also include further child subquery nodes (e.g., node 304), as shown in FIG. 3*a*.

At 206, elementary subqueries may be identified and collected. FIG. 4 illustrates exemplary elementary subqueries 402 and 404. Any identical subqueries may be grouped into groups of identical subqueries, at 208. For example, a subquery statement "select a from complex_query" may be repeated (or be identical to) other parts of the elementary subqueries 402 and 404 and, hence, may be part of a first identical subqueries group 406. A subquery statement "select b from complex_query2" may be also repeated in (or be identical to) other parts of the elementary subqueries 402, 404, and thus, may part of a second identical subqueries group 408, as shown in FIG. 4.

At 210, parents of each subquery groups may be identified and groups of identical parent subqueries may be identified. FIG. 5 illustrates identification and grouping of identical parent subqueries. FIG. 5 illustrates elementary subqueries 402, 404 shown in FIG. 4 along with subquery groups 406, 408, where subquery group 406 may include a parent subquery 502 starting with "select a from" and subquery group 408 may include a parent subquery 504 starting with "select b from". As shown in FIG. 5, parent subqueries 502 and 504 (similar to their child nodes) may be repeated in other parents of the elementary subqueries 402, 404 and hence may be grouped together.

At 212, a determination may be made whether there are any more identical parent subqueries (e.g., such as identical parent subqueries 602 as shown in FIG. 6). If there are additional identical parent subqueries, the process 200 may return to 210 and repeated until there are no more identical parent subqueries left for grouping. Otherwise, the processing may proceed to 214, where lower identical subqueries that appear only once per upper subquery may be disregarded, as shown in FIG. 7 (e.g., parent subqueries 502 and 504 as shown in FIG. 5) during alias assignment process as well as replacement of identical parent subqueries with aliases (as discussed below).

At 216, aliases may be assigned to one or more identical (parent) subqueries for addition to common table expression (CTE) syntax statement (e.g., WITH statement). At 218, a CTE syntax tree that may include identical subqueries and assigned aliases may be generated. The assignment of aliases may begin with the lowest subquery in the group. For example, a first subquery 406 (as shown in FIG. 4) may be added to the CTE statement 800, where the first subquery 406 (i.e., "select a from complex_query") may be replaced with alias "_WSQ1" 801 and rewritten as statement 802 (shown in dashed lines), as shown in FIG. 8. While FIG. 8 illustrates use of the WITH statement, any other CTE syntax statement may be used. Similarly, the second subquery 408 (as shown in FIG. 4) may be also added to the CTE statement, where the second subquery 408 (i.e., "select b from complex_query") may be replaced with alias "_WSQ2" 803 and rewritten as statement 804 (shown in dashed lines). The parent subquery 602 may be also included in the WITH statement 800 and rewritten as statement 806 including alias "_WSQ3" 805, as shown in FIG. 8 (dashed lines). The aliases 801, 803, 805 may be reused in the WITH statement 800 every time the respective identical query statements need to be executed, as shown by dashed boxes in FIG. 8.

At 220, the previously aliased subqueries may then be removed from the main body of the syntax tree and replaced with their alias names. As shown in FIG. 8, the main body of the SELECT statement shows two such replacements using alias "_WSQ3" 805 (shown in dashed lines).

At 222, the generated syntax tree may be converted to a query language (e.g., SQL) string (e.g., string 800 shown in FIG. 8) that may be executed by the database system 106 (shown in FIG. 1). The string may include assigned aliases 801, 803, 805 and may be transmitted to the database system 106 for execution, at 224.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 9:
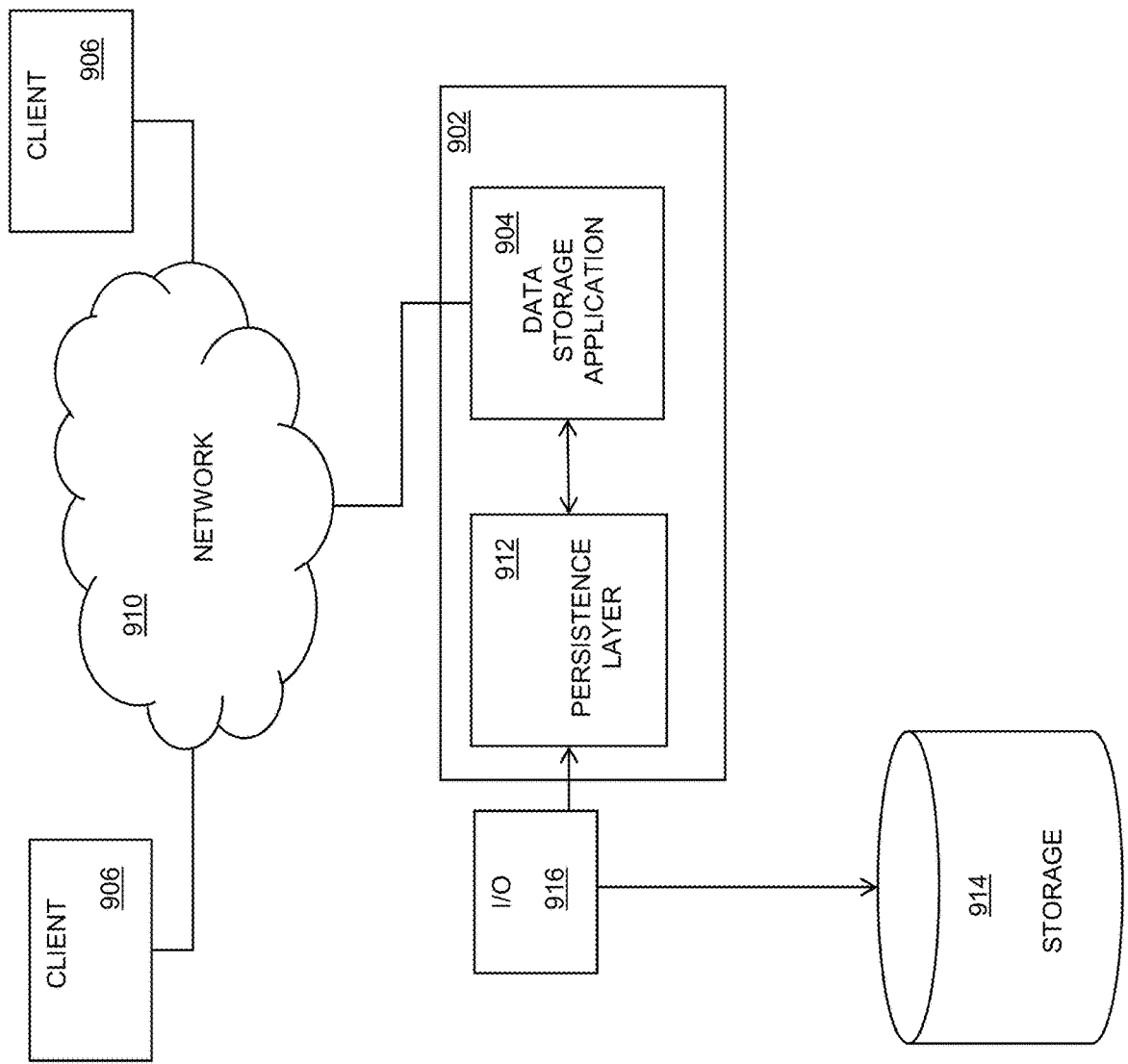
FIG. 9 is a diagram illustrating an exemplary system including a data storage application, according to some implementations of the current subject matter.

FIG. 9 illustrates an exemplary system 900 in which a computing system 902, which may include one or more programmable processors that may be collocated, linked over one or more networks, etc., executes one or more modules, software components, or the like of a data storage application 904, according to some implementations of the current subject matter. The data storage application 904 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 902 as well as to remote users accessing the computing system 902 from one or more client machines 906 over a network connection 910. One or more user interface screens produced by the one or more first modules may be displayed to a user, either via a local display or via a display associated with one of the client machines 906. Data units of the data storage application 904 may be transiently stored in a persistence layer 912 (e.g., a page buffer or other type of temporary persistency layer), which may write the data, in the form of storage pages, to one or more storages 914, for example via an input/output component 916. The one or more storages 914 may include one or more physical storage media or devices (e.g. hard disk drives, persistent flash memory, random access memory, optical media, magnetic media, and the like) configured for writing data for longer term storage. It should be noted that the storage 914 and the input/output component 916 may be included in the computing system 902 despite their being shown as external to the computing system 902 in FIG. 9.

Data retained at the longer term storage 914 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 10:
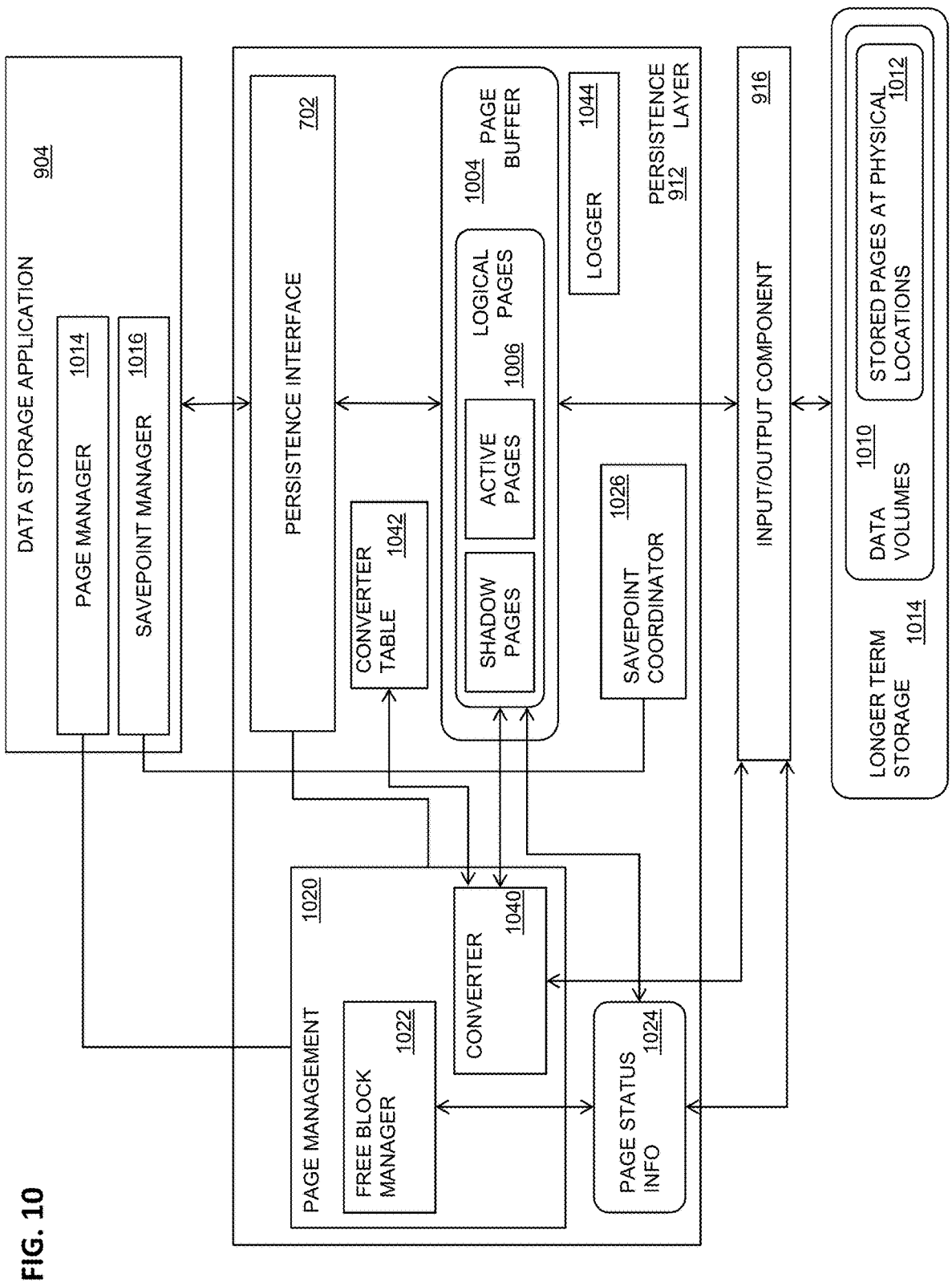
FIG. 10 is a diagram illustrating details of the system of FIG. 9.

FIG. 10 illustrates exemplary software architecture 1000, according to some implementations of the current subject matter. A data storage application 904, which may be implemented in one or more of hardware and software, may include one or more of a database application, a network-attached storage system, or the like. According to at least some implementations of the current subject matter, such a data storage application 904 may include or otherwise interface with a persistence layer 912 or other type of memory buffer, for example via a persistence interface 1002. A page buffer 1004 within the persistence layer 912 may store one or more logical pages 1006, and optionally may include shadow pages, active pages, and the like. The logical pages 1006 retained in the persistence layer 912 may be written to a storage (e.g. a longer term storage, etc.) 914 via an input/output component 916, which may be a software module, a sub-system implemented in one or more of software and hardware, or the like. The storage 914 may include one or more data volumes 1010 where stored pages 1012 are allocated at physical memory blocks.

In some implementations, the data storage application 904 may include or be otherwise in communication with a page manager 1014 and/or a savepoint manager 1016. The page manager 1014 may communicate with a page management module 1020 at the persistence layer 912 that may include a free block manager 1022 that monitors page status information 1024, for example the status of physical pages within the storage 914 and logical pages in the persistence layer 912 (and optionally in the page buffer 1004). The savepoint manager 1016 may communicate with a savepoint coordinator 1026 at the persistence layer 912 to handle savepoints, which are used to create a consistent persistent state of the database for restart after a possible crash.

In some implementations of a data storage application 904, the page management module of the persistence layer 912 may implement a shadow paging. The free block manager 1022 within the page management module 1020 may maintain the status of physical pages. The page buffer 1004 may include a fixed page status buffer that operates as discussed herein. A converter component 1040, which may be part of or in communication with the page management module 1020, may be responsible for mapping between logical and physical pages written to the storage 914. The converter 1040 may maintain the current mapping of logical pages to the corresponding physical pages in a converter table 1042. The converter 1040 may maintain a current mapping of logical pages 1006 to the corresponding physical pages in one or more converter tables 1042. When a logical page 1006 is read from storage 914, the storage page to be loaded may be looked up from the one or more converter tables 1042 using the converter 1040. When a logical page is written to storage 914 the first time after a savepoint, a new free physical page is assigned to the logical page. The free block manager 1022 marks the new physical page as "used" and the new mapping is stored in the one or more converter tables 1042.

The persistence layer 912 may ensure that changes made in the data storage application 904 are durable and that the data storage application 904 may be restored to a most recent committed state after a restart. Writing data to the storage 914 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 1044 may also be included to store the changes made to the data of the data storage application in a linear log. The logger component 1044 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 1044 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 912 may use a combination of undo log entries (from one or more logs) and shadow paging.

The persistence interface 1002 may handle read and write requests of stores (e.g., in-memory stores, etc.). The persistence interface 1002 may also provide write methods for writing data both with logging and without logging. If the logged write operations are used, the persistence interface 1002 invokes the logger 1044. In addition, the logger 1044 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 1044. For an entry of type "update", for example, this would be the identification of the affected record and the after image of the modified data.

When the data application 904 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 1044 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 1044 may write a database log (or simply referred to herein as a "log") sequentially into a memory buffer in natural order (e.g., sequential order, etc.). If several physical hard disks/storage devices are used to store log data, several log partitions may be defined. Thereafter, the logger 1044 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 904 may use shadow paging so that the savepoint manager 1016 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 11:
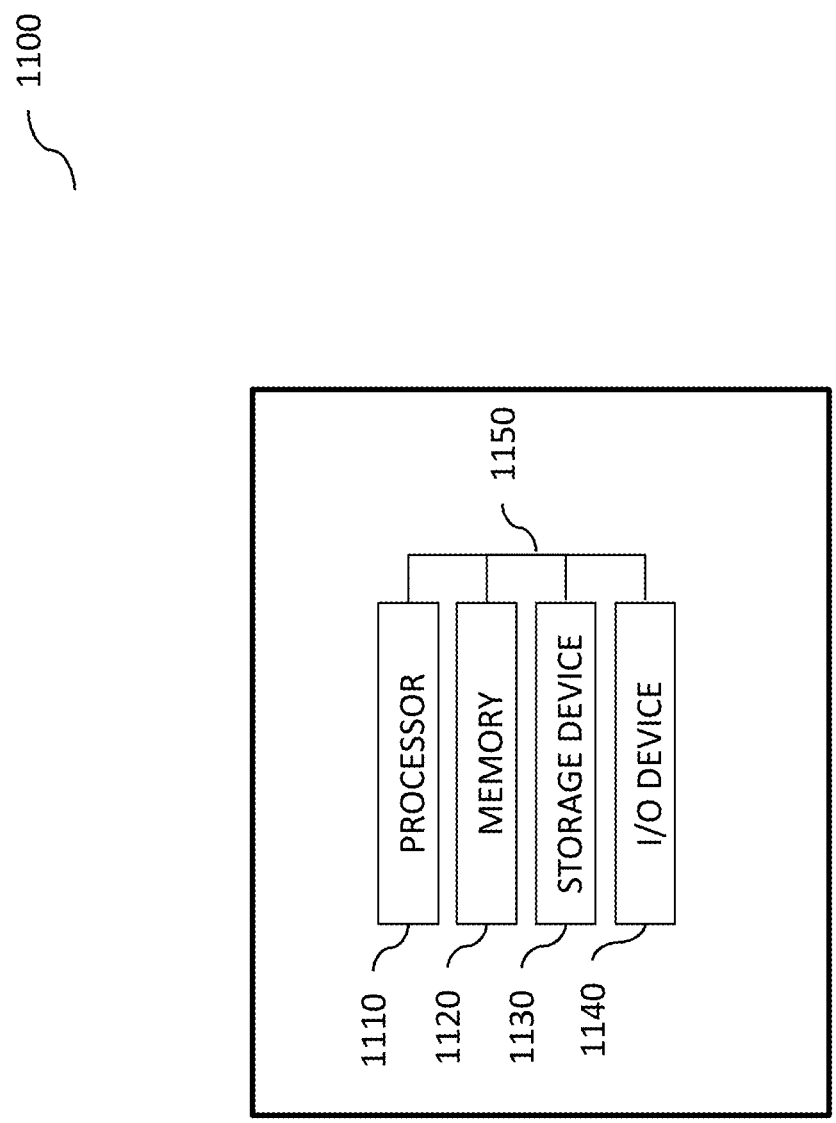
FIG. 11 is an exemplary system, according to some implementations of the current subject matter.

In some implementations, the current subject matter may be configured to be implemented in a system 1100, as shown in FIG. 11. The system 1100 may include a processor 1110, a memory 1120, a storage device 1130, and an input/output device 1140. Each of the components 1110, 1120, 1130 and 1140 may be interconnected using a system bus 1150. The processor 1110 may be configured to process instructions for execution within the system 1100. In some implementations, the processor 1110 may be a single-threaded processor. In alternate implementations, the processor 1110 may be a multi-threaded processor. The processor 1110 may be further configured to process instructions stored in the memory 1120 or on the storage device 1130, including receiving or sending information through the input/output device 1140. The memory 1120 may store information within the system 1100. In some implementations, the memory 1120 may be a computer-readable medium. In alternate implementations, the memory 1120 may be a volatile memory unit. In yet some implementations, the memory 1120 may be a non-volatile memory unit. The storage device 1130 may be capable of providing mass storage for the system 1100. In some implementations, the storage device 1130 may be a computer-readable medium. In alternate implementations, the storage device 1130 may be a floppy disk device, a hard disk device, an optical disk device, a tape device, non-volatile solid state memory, or any other type of storage device. The input/output device 1140 may be configured to provide input/output operations for the system 1100. In some implementations, the input/output device 1140 may include a keyboard and/or pointing device. In alternate implementations, the input/output device 1140 may include a display unit for displaying graphical user interfaces.

Figure 12:
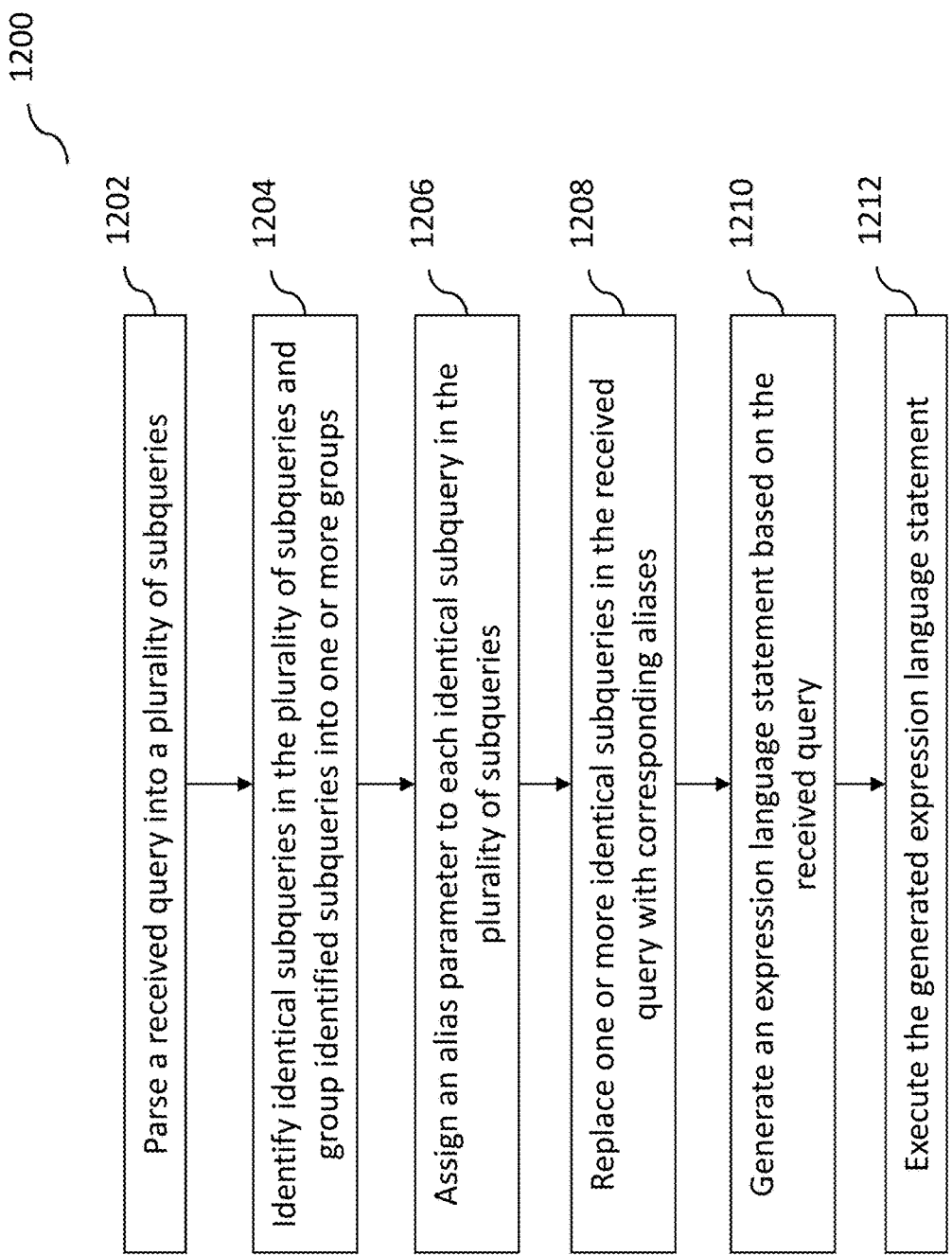
FIG. 12 is an exemplary method, according to some implementations of the current subject matter.

FIG. 12 illustrates an exemplary method 1200 for rewriting queries (such as to reduce execution time, reduce memory consumption, etc.), according to some implementations of the current subject matter. At 1202, a received query may be parsed into a plurality of subqueries (e.g., as shown in FIGS. 4-8). Each subquery in the plurality of subqueries may have one or more query elements (e.g., its own query elements, language, parameters, operands, etc.). At 1204, one or more identical subqueries in the plurality of subqueries may be identified and then grouped into one or more groups (e.g., as shown in FIGS. 4-8). At 1206, an alias parameter may be assigned to each identical subquery in the plurality of subqueries based on the one or more groups of subqueries (e.g., "_WSQ1" 801, "_WSQ2" 803, "_WSQ3" 805, as shown in FIG. 8). At 1208, one or more identical subqueries may be replaced with their alias names in the main body of the received query. At 1210, an expression language statement may be generated based on the received query (e.g., as shown by the WITH statement in FIG. 8). Each identical subquery may be replaced with corresponding assigned alias parameter in the expression language. At 1212, the generated expression language statement may be executed (e.g., transmitted to the database system and then executed therein).

In some implementations, the current subject matter may include one or more of the following optional features. The parsing of the query (e.g., may be performed by a parser) may include generation of a syntactical tree having a plurality nodes (e.g., syntactical tree 300 as shown in FIG. 3*a*). Each node in the plurality of nodes may correspond to a subquery in the plurality of subqueries (as for example is shown in FIGS. 4-8). Further, the generated expression language statement may be generated using the generated syntactical tree. The syntactical tree may be configured to define a structure of the received query (e.g., as shown in FIG. 3*a*). Moreover, the identified identical subqueries may be grouped into one or more groups (e.g., as shown in FIGS. 4-8) using one or more parent nodes in the syntactical tree of nodes including the identical queries. Further, the alias parameters (e.g., "_WSQ1" 801, "_WSQ2" 803, "_WSQ3" 805, as shown in FIG. 8) may be configured to be assigned using parent nodes in the syntactical tree.

In some implementations, the generated expression language statement may be a common table expressions (CTE) language statement. The received query may be a structured query language (SQL) statement.

In some implementations, the generated expression language statement may be executed by a database system (e.g., HANA system as developed by SAP SE, Walldorf, Germany) for the purposes of retrieving data queried by the received query.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   parsing a received query into a plurality of subqueries, each subquery in the plurality of subqueries having one or more query elements;
   identifying, using a syntax of each subquery in the plurality of subqueries, one or more identical subqueries in the plurality of subqueries and grouping the identified one or more subqueries into one or more groups;
   assigning, based on the one or more groups of subqueries, an alias parameter to each identical subquery in the plurality of subqueries, wherein one or more lower elementary subqueries in the plurality of subqueries are excluded from the assigning based on a frequency of appearance in one or more upper subqueries in the plurality of subqueries;
   replacing one or more identical subqueries in the received query with corresponding aliases;
   generating an expression language statement based on the received query, wherein each identical subquery is replaced with the corresponding assigned alias parameter in the expression language; and
   executing the generated expression language statement.

2. The method according to claim 1, wherein parsing further comprises
   generating a syntactical tree having a plurality nodes, each node in the plurality of nodes corresponding a subquery in the plurality of subqueries.

3. The method according to claim 2, wherein the generated expression language statement being generated using the generated syntactical tree, the syntactical tree is configured to define a structure of the received query.

4. The method according to claim 3, wherein the identified one or more subqueries are grouped into one or more groups using one or more parent nodes in the syntactical tree of nodes including the one or more identical queries.

5. The method according to claim 4, wherein one or more alias parameters are configured to be assigned using the one or more parent nodes in the syntactical tree.

6. The method according to claim 1, wherein the generated expression language statement is a common table expressions language statement, and the received query is a structured query language statement.

7. The method according to claim 1, wherein the generated expression language statement is executed by a database system to retrieve data queried by the received query.

8. A system comprising:
   at least one programmable processor; and
   a non-transitory machine-readable medium storing instructions that, when executed by the at least one programmable processor, cause the at least one programmable processor to perform operations comprising:
   parsing a received query into a plurality of subqueries, each subquery in the plurality of subqueries having one or more query elements;

identifying, using a syntax of each subquery in the plurality of subqueries, one or more identical subqueries in the plurality of subqueries and grouping the identified one or more subqueries into one or more groups;

assigning, based on the one or more groups of subqueries, an alias parameter to each identical subquery in the plurality of subqueries, wherein one or more lower elementary subqueries in the plurality of subqueries are excluded from the assigning based on a frequency of appearance in one or more upper subqueries in the plurality of subqueries;

replacing one or more identical subqueries in the received query with corresponding aliases;

generating an expression language statement based on the received query, wherein each identical subquery is replaced with the corresponding assigned alias parameter in the expression language; and executing the generated expression language statement.

9. The system according to claim 8, wherein parsing further comprises generating a syntactical tree having a plurality nodes, each node in the plurality of nodes corresponding a subquery in the plurality of subqueries.

10. The system according to claim 9, wherein the generated expression language statement being generated using the generated syntactical tree, the syntactical tree is configured to define a structure of the received query.

11. The system according to claim 10, wherein the identified one or more subqueries are grouped into one or more groups using one or more parent nodes in the syntactical tree of nodes including the one or more identical queries.

12. The system according to claim 11, wherein one or more alias parameters are configured to be assigned using the one or more parent nodes in the syntactical tree.

13. The system according to claim 8, wherein the generated expression language statement is a common table expressions language statement, and the received query is a structured query language statement.

14. The system according to claim 8, wherein the generated expression language statement is executed by a database system to retrieve data queried by the received query.

15. A computer program product comprising a non-transitory machine-readable medium storing instructions that, when executed by at least one programmable processor, cause the at least one programmable processor to perform operations comprising:

parsing a received query into a plurality of subqueries, each subquery in the plurality of subqueries having one or more query elements;

identifying, using a syntax of each subquery in the plurality of subqueries, one or more identical subqueries in the plurality of subqueries and grouping the identified one or more subqueries into one or more groups;

assigning, based on the one or more groups of subqueries, an alias parameter to each identical subquery in the plurality of subqueries, wherein one or more lower elementary subqueries in the plurality of subqueries are excluded from the assigning based on a frequency of appearance in one or more upper subqueries in the plurality of subqueries;

replacing one or more identical subqueries in the received query with corresponding aliases;

generating an expression language statement based on the received query, wherein each identical subquery is replaced with the corresponding assigned alias parameter in the expression language; and executing the generated expression language statement.

16. The computer program product according to claim 15, wherein parsing further comprises generating a syntactical tree having a plurality nodes, each node in the plurality of nodes corresponding a subquery in the plurality of subqueries.

17. The computer program product according to claim 16, wherein the generated expression language statement being generated using the generated syntactical tree, the syntactical tree is configured to define a structure of the received query.

18. The computer program product according to claim 17, wherein the identified one or more subqueries are grouped into one or more groups using one or more parent nodes in the syntactical tree of nodes including the one or more identical queries.

19. The computer program product according to claim 18, wherein one or more alias parameters are configured to be assigned using the one or more parent nodes in the syntactical tree.

20. The computer program product according to claim 15, wherein the generated expression language statement is a common table expressions language statement, and the received query is a structured query language statement;

wherein the generated expression language statement is executed by a database system to retrieve data queried by the received query.

* * * * *